A. H. PFUND.
HEADLIGHT.
APPLICATION FILED JULY 7, 1917.

1,299,219.

Patented Apr. 1, 1919.

Witnesses,

Inventor
August Herman Pfund.
By Edwin K. Samuels
Attorney

UNITED STATES PATENT OFFICE.

AUGUST HERMAN PFUND, OF BALTIMORE, MARYLAND.

HEADLIGHT.

1,299,219.  Specification of Letters Patent.  Patented Apr. 1, 1919.

Application filed July 7, 1917. Serial No. 179,149.

*To all whom it may concern:*

Be it known that I, AUGUST HERMAN PFUND, a citizen of the United States of America, residing at the city of Baltimore, State of Maryland, have invented certain new and useful Improvements in Headlights, of which the following is a specification.

The increased danger incident to automobile traffic at night owing to the glare of the headlights is well-known. In city driving the powerful lights are extinguished or dimmed and the main difficulty in such driving is that sufficient illumination cannot be had within the law. On the out-of-town roads where powerful lights are thought necessary and have been permitted, a driver is not infrequently blinded by the glare of the lights of a passing car. Danger from this source is excessive. Because of these conditions, the laws of some localities now provide that lights used in the city or country shall not glare at a given distance and height.

The use of screens or dimmers covering all but a small portion of the reflector is well-known but such coverings stop the majority of the rays so that the efficiency is very low and the illuminated field is divided from the wholly shaded field by a penumbra the width of which increases with the distance from the light. This penumbra is insufficiently lighted and at no great distance covers a very considerable portion of the field of illumination.

The object of the present invention is to so control the distribution of the light rays as to give sufficient illumination without blinding or interfering with the vision of pedestrians or drivers of passing vehicles. This is done by projecting across the field of illumination an inverted image of an opaque screen, thus limiting the field of illumination and protecting the eyes. This image is well-defined as to the edge of the screen and the field of intense illumination extends up to the line forming the edge of the screen, giving at any distance from the light a very sharp line of demarcation between the most intense illumination and the wholly un-illuminated area. This line may be made straight and horizontal and may be projected at the required elevation with the dark area above. In this way the beneficial illuminative effect on the road is retained in full and the glare avoided in complete compliance with the principle of the law just stated.

The effect described is accomplished by means of the usual source of illumination and reflector with a lens in place of the ordinary glass window, a portion of the reflector below the light being covered by a screen which extends from the lens backward to or near the principal focus of the lens.

In the preferred form of the invention, the lens used is plano-cylindrical or the equivalent, and the screen covers the reflector forward of the principal focus on the side of the optic plane remote from or below the source of illumination, the screen terminating in a straight line parallel to the elements of the cylinder at or near the principal focus or focal line of the lens or lenses and preferably coincident with such focal line. By optic plane, I mean a plane containing the principal focus of the lens or lenses and in a plano-cylindrical lens at right angles to the plane surface of the lens.

In order to accomplish the effect specified in the law referred to which forbids glare at a certain distance and height, I prefer to use the cylindrical lens with its axis horizontal, the focus being below the source of light and the screen having its upper edge which is in the optic plane horizontal and preferably coinciding with the principal focus of the lens.

An important feature of the invention is that the lens and screen combined may be furnished as stock accessories adapted to be used in any light by merely removing the old glass and inserting in place of it, the lens glass and screen which comes fastened to the glass. The entire outfit assembled new is of course equally within the scope of my invention.

In the accompanying drawing, I have illustrated an automobile headlight constructed in accordance with the form of my invention which is now considered the preferred form.

Figure 1:
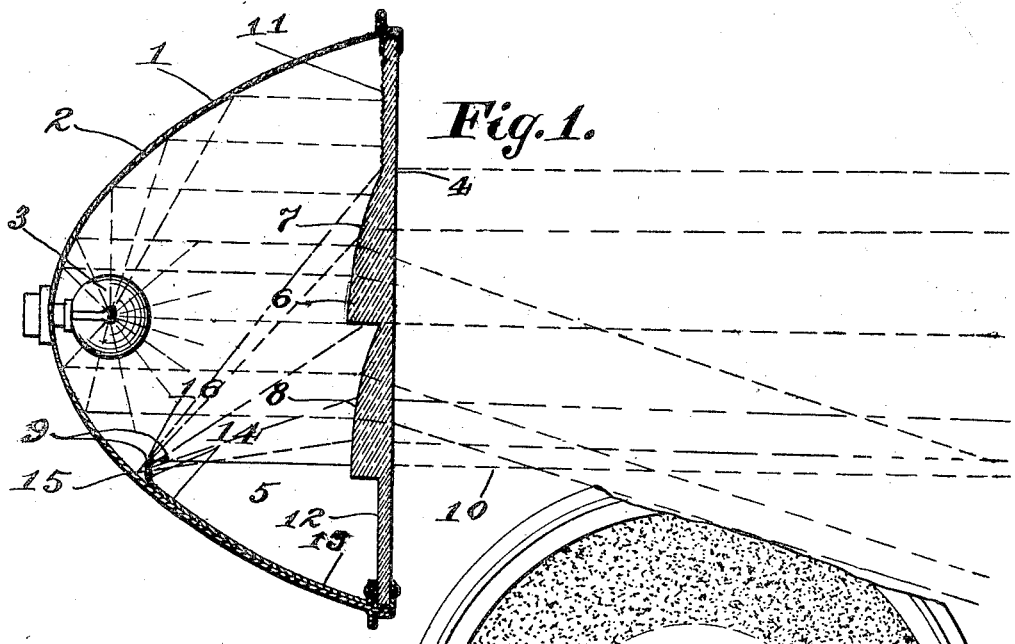
Figure 1 is a vertical central section.
Figure 2:
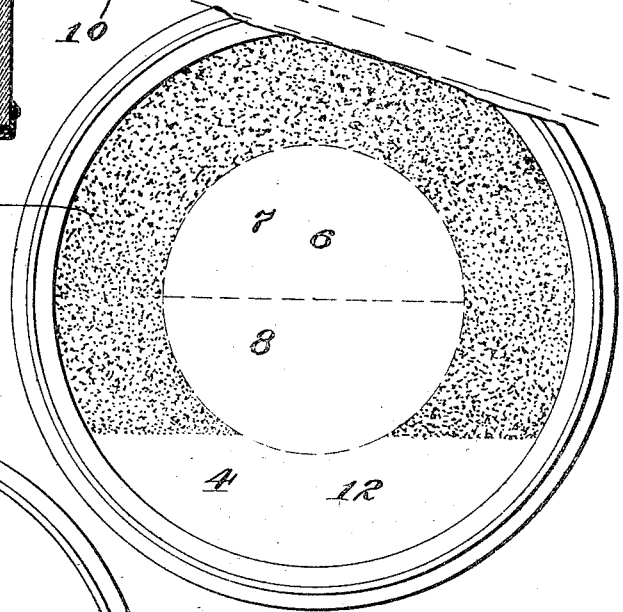
Fig. 2 is a front view showing the lens and so forth.
Figure 3:
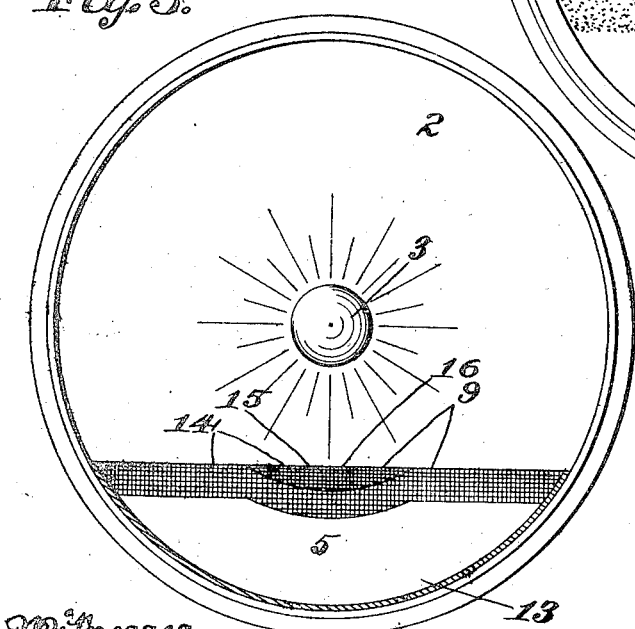
Fig. 3 is a view with the front glass removed.

Referring to the drawings by numerals, I have illustrated a headlight 1 which so far as the reflector 2 with a lamp or source of illumination 3 is concerned, may be the ordinary commercial article. To this I have added a glass 4 which is substituted for the usual front glass or window in such lights, and a screen 5 shown in the form of a scoop with the front edge closed by a transverse wall. This glass includes a lens 6 which to give the most perfect results should be cylindrical or approaching cylindrical, and to avoid undue thickness, this lens may be, and as shown is, made with two or more cylindrical or lens surfaces or steps 7, 8, with their principal foci 9 in the same plane, referred to herein as the optic plane 10, but the principal foci are not necessarily coincident. The lens or lenses as shown are plano-convex, having the convex side inward or to the rear. The screen effect may be had by any suitable covering as painting, etc. Where the device is merely used as a means for refitting an old lamp, the scoop or screen 5 may be conveniently fastened to the bottom of the glass or lens 4 to be inserted with the glass. In this way, it is possible for the manufacturer to determine once for all the position of the top edge of the screen relatively to the lens. In the form of the invention shown, the lens or lenses occupy a comparatively small area at the center of the glass though as great an area as desired may be occupied by the lens or lenses. In the form shown, the surrounding upper portion 11 is ground or roughened to diffuse the light and the area 12 opposite the screen made plain to permit the direct rays of the light to be projected downward in front of the machine though this is of no great importance.

The screen 5 which broadly is merely a diffusing or absorbent surface, may be provided and secured in any suitable manner, and painted white at the lower or outer portion 15 and black at the upper portion 14, or otherwise so long as its surface is non-glare producing. As illustrated, to give a sharp line of demarcation between the light field and the screen image or dark field, the rear wall of the screen at 15 is made substantially flat and vertical with a straight top edge, the edge to be "projected," being indicated by reference character 16. This is in the optical plane 10 of the lenses and preferably coincident with the focus of the lower or near lens or step 8.

It will be understood that while in the preferred arrangement, I place the screen at the bottom of the reflector with its edge 16 horizontal, making the optic plane of the lens or lenses and the principal focus horizontal so that the projected edge of the screen is likewise horizontal, the screen and lenses may be tipped to any desired angle. It is of course understood that the rays cross in front of the lens so that the illuminated field is below the projected edge 16 and the dark field above.

In the operation of my invention, the edge 16 of the screen being in the optic plane and at the focus of the lens, is projected forward to infinity, being reproduced on any surface which it encounters with practically equal distinctness at almost any distance, the perfection of the outline being of course dependent on the perfection of the lens. The field above the optic plane of the lens or lenses is dark, the rays from the entire surface of the reflector in line with the lens being projected forward at or beneath the optic plane which divides the dark area and the area which is most highly illuminated, and the most efficient illumination which can conform to the non-glare requirement specified, results.

While the lens sections 7 and 8 are referred to as having their principal foci in the same plane, this, though preferable, is not essential to the construction illustrated. The important consideration is that the projected edge 16 shall be in the focal plane of the lens surface 8, preferably at the principal focus. The important consideration regardly the lens surface 7 is that it shall turn all the rays that it receives downwardly to prevent glare and leave the projected edge 16 sharp and well-defined. In any arrangement of the device within the limits first defined, what may be termed an image of the screen is projected forwardly at the top of the bar of light, and the effect is so marked, that we have a sharp transition from light to dark so well defined that the top of a man's face 50 feet away may be hidden in darkness while the lower portion is illuminated. This effect is entirely dependent on the arrangement of the condensing device in combination with the screen edge and image-forming lens.

I have thus described my invention specifically and in detail in order that its nature and operation may be fully understood; however, the specific terms herein are used descriptively rather than in their limiting sense and the scope of the invention is defined in the claims.

I claim:

1. In a headlight in combination, a condenser, a source of illumination, a lens having an optic plane, and means for obstructing a portion of the rays, said means terminating in an edge in the optic plane of said lens whereby an image of said obstructing means with a well-defined edge separating an intensely illuminated field from a dark field without intervening penumbra, is projected forward in place of the usual field of illumination.

2. In a headlight in combination, a source of illumination, a reflector, a cylindrical lens, a non-reflecting surface below the light, terminating at its upper edge, substantially in the optical plane of said lens, the reflector, source of illumination and the lens being arranged to project a well-defined image of said edge, serving to divide an intensely illuminated field and an adjacent dark field the illuminated field being below the image.

3. In a headlight in combination, a source of light, a condenser, a cylindrical image-forming lens, an edge substantially parallel to the elements of the lens near the principal focus, a non-reflecting surface extending downward from said edge and shading the reflector below the optic plane of the lens whereby a well-defined image of the straight edge is projected forward, the same separating an intensely illuminated field below from a dark field above.

4. In a headlight in combination a parabolic reflector, a source of light at or near the principal focus of the parabola, a cylindrical image-forming lens, an edge in the optic plane and substantially parallel to and near the principal focus of the lens, a non-reflecting surface extending from the straight edge so there is no reflection from below the focal plane, whereby an image of the said edge is projected into infinity, the same separating the most intensely illuminated portion of the lighted field from a dark area above.

5. In a headlight in combination, a condenser, a source of illumination, an image-forming lens having its principal focus defined by a line transverse to the axis of the headlight, and a non-reflecting surface terminating at its upper extremity in an edge parallel to and in the horizontal plane with said principal focus.

6. In a headlight in combination a parabolic reflector, a source of illumination at the optical center of the parabola, a plano-cylindrical lens having its principal focus defined by a line transverse to the axis of the headlight and a screen or non-reflecting surface terminating in an edge near the focal plane of the lens, the screen covering the reflector forward of the said line and below the optic plane of the lens.

7. In combination a source of light, a condensing reflector, a plano-cylindrical image-forming lens and a non-reflecting surface terminating in a top edge in the optic plane of the lens.

8. In combination a source of light, a condensing reflector, a plano-cylindrical image-forming lens and a non-reflecting surface terminating in a top edge substantially coincident with the principal focus of said lens and in the optic plane of the lens.

Signed by me at Baltimore, Maryland, this 6th day of July, 1917.

AUGUST HERMAN PFUND.

Witnesses:
PORTER H. FLAUTT,
ZELLA KUHN.